United States Patent
Darcy, III (10) Patent No.: US 6,815,131 B2
(45) Date of Patent: Nov. 9, 2004

(54) METHOD FOR MAKING AN IMAGING BELT

(75) Inventor: John J. Darcy, III, Webster, NY (US)

(73) Assignee: Xerox Corporation, Stamford, CT (US)

( * ) Notice: Subject to any disclaimer, the term of this patent is extended or adjusted under 35 U.S.C. 154(b) by 111 days.

(21) Appl. No.: 10/237,794

(22) Filed: Sep. 6, 2002

(65) Prior Publication Data

US 2004/0048176 A1 Mar. 11, 2004

(51) Int. Cl.$^7$ .............................. G03G 15/00
(52) U.S. Cl. ........................................ 430/56
(58) Field of Search ................................ 430/56

(56) References Cited

U.S. PATENT DOCUMENTS

| | | | |
|---|---|---|---|
| 3,418,185 A | 12/1968 | Balamuth et al. | 156/73 |
| 3,459,610 A | 8/1969 | Dijkers | 156/73 |
| 3,610,506 A | 10/1971 | Robinson | 228/1 |
| 3,678,566 A | 7/1972 | Ellis et al. | 29/470.3 |
| 3,717,539 A | 2/1973 | Roberts | 156/498 |
| 3,879,256 A | 4/1975 | Rust, Jr. | 156/580 |
| 3,904,474 A | 9/1975 | Wasco et al. | 156/581 |
| 3,939,033 A | 2/1976 | Grgach et al. | 156/515 |
| 3,947,307 A | 3/1976 | Buchscheidt | 156/73.1 |
| 4,019,014 A | 4/1977 | Byrne | 219/118 |
| 4,259,419 A | 3/1981 | Uba et al. | 429/174 |
| 4,265,990 A | 5/1981 | Stolka et al. | 430/59 |
| 4,313,778 A | 2/1982 | Mims | 156/359 |
| 4,496,095 A | 1/1985 | Renshaw et al. | 228/102 |
| 4,532,166 A | 7/1985 | Thomsen et al. | 428/57 |
| 4,533,423 A | 8/1985 | Johnson et al. | 156/359 |
| 4,750,970 A | 6/1988 | Malosh | 156/580.1 |
| 4,838,964 A | 6/1989 | Thomsen et al. | 156/73.1 |
| RE33,063 E | 9/1989 | Obeda | 156/73.1 |
| 4,878,985 A | 11/1989 | Thomsen et al. | 156/459 |
| 4,883,742 A | 11/1989 | Wallbillich et al. | 430/275 |
| 5,085,719 A | 2/1992 | Eck | 156/73.4 |
| 5,148,958 A | 9/1992 | Eskandari et al. | 228/3.1 |
| 5,163,265 A | 11/1992 | Darcy et al. | 53/118 |
| 5,190,608 A | 3/1993 | Darcy et al. | 156/73.4 |
| 5,282,345 A | 2/1994 | Darcy et al. | 53/118 |
| 5,300,391 A | 4/1994 | Fabian et al. | 430/127 |
| 5,549,999 A | 8/1996 | Swain et al. | 430/127 |
| 5,552,005 A | 9/1996 | Mammino et al. | 156/157 |
| 5,868,401 A | 2/1999 | Darcy, III | 279/3 |
| 6,042,917 A | 3/2000 | Schlueter, Jr. et al. | 428/60 |
| 6,056,839 A | 5/2000 | Yu et al. | 156/137 |
| 6,068,722 A | 5/2000 | Yu et al. | 156/137 |
| 6,074,504 A | 6/2000 | Yu et al. | 156/137 |
| 6,165,670 A | 12/2000 | Yu et al. | 430/130 |
| 6,197,461 B1 | 3/2001 | Foltz et al. | 430/56 |
| 6,277,534 B1 | 8/2001 | Foltz et al. | 430/56 |
| 6,336,982 B1 | 1/2002 | Yu et al. | 156/64 |

FOREIGN PATENT DOCUMENTS

| | | |
|---|---|---|
| DE | 29 22 834 | 12/1980 |
| EP | 0 475 782 A1 | 3/1992 |
| FR | 1.264.171 | 5/1961 |
| FR | 1.314.142 | 11/1962 |
| JP | 62297138 | 12/1987 |

OTHER PUBLICATIONS

EPC Search Report dated Dec. 9, 1991 (3 pages).
U.S. application No. 07/583,260 filed Sep. 14, 1990 entitled "High Frequency Welding of Thermoplastic Belts".

Primary Examiner—Mark A. Chapman
(74) Attorney, Agent, or Firm—Andrew D. Ryan (57) ABSTRACT

A method of forming a flexible belt including: providing a flexible member; providing a work surface; forming the flexible member in a loop shape including an overlap region; positioning the overlap region of the flexible member in pressure contact with the work surface such that the photosensitive surface and the work surface is on the outside of the loop shape; positioning a welding tool on an inside surface of the loop shape of the flexible member opposite the overlap region; and ultrasonically welding the flexible member at one or more locations.

23 Claims, 8 Drawing Sheets

METHOD FOR MAKING AN IMAGING BELT

This invention relates in general to imaging belts and, more specifically, to a method for making a flexible belt.

Flexible imaging belts include, for example, electrophotographic imaging belts or photoreceptors for electrophotographic imaging systems, ionographic imaging belts or electroreceptors for electrographic imaging systems, and intermediate image transfer belts for transferring toner images used in an electrophotographic or an electrographic imaging system.

Flexible electrophotographic imaging belts are usually multilayered photoreceptors that comprise a substrate, an electrically conductive layer, an optional hole blocking layer, an adhesive layer, a charge generating layer, and a charge transport layer and, in some embodiments, an anti-curl backing layer. One type of multilayered photoreceptor comprises a layer of finely divided particles of a photoconductive inorganic compound dispersed in an electrically insulating organic resin binder. A layered photoreceptor having separate charge generating (photogenerating) and charge transport layers is described in U.S. Pat. No. 4,265,990.

The flexible electrophotographic imaging belts may be fabricated from a sheet cut from an imaging member web. The sheets are generally rectangular or parallelogram in shape. All edges may be of the same length or one pair of parallel edges may be longer than the other pair of parallel edges. The sheets are formed into a belt by joining the overlapping opposite marginal end regions of the sheet. A seam may be produced in the overlapping marginal end regions at the point of joining. Joining may be effected by any suitable means. Joining techniques include welding (including ultrasonic), gluing, taping, pressure heat fusing, and the like. However, ultrasonic welding is generally the chosen method for flexible imaging member seam joining because it is rapid, clean (no solvents), produces a thin and narrow seam, and a low cost seaming technique. In addition, ultrasonic welding is preferred because the mechanical pounding of the welding horn causes generation of heat at the contiguous overlapping end marginal regions of the sheet to maximize melting of one or more layers therein to form a strong seam joint. The ultrasonic welding process is carried out by holding down the overlapped ends of a flexible imaging member sheet with vacuum against a flat anvil surface and guiding the flat end of an ultrasonic vibrating horn transversely across the width of the sheet, over and along the length of the overlapped ends, to form a welded seam.

When ultrasonically welded into a belt, the seam of flexible multilayered electrophotographic imaging member belts may occasionally contain undesirable high protrusions such as peaks, ridges, spikes, and is mounds. These seam protrusion spots may present problems during image cycling of the belt in the machine because they interact with cleaning blades which may affect cleaning blade efficiency and service life. Moreover, the protrusion high spots in the seam may also interfere with the operation of subsystems of copiers, printers and duplicators.

Imaging belts are manually inspected after seam welding by passing a cotton glove over the entire seam length and belts found catching the glove by the protrusions are identified as production rejects. Both the time consuming procedure of manual inspection and the number of seamed belts rejected due to the presence of high seam protrusions constitute a substantial financial burden on the production cost of imaging member belts.

Figure 1:
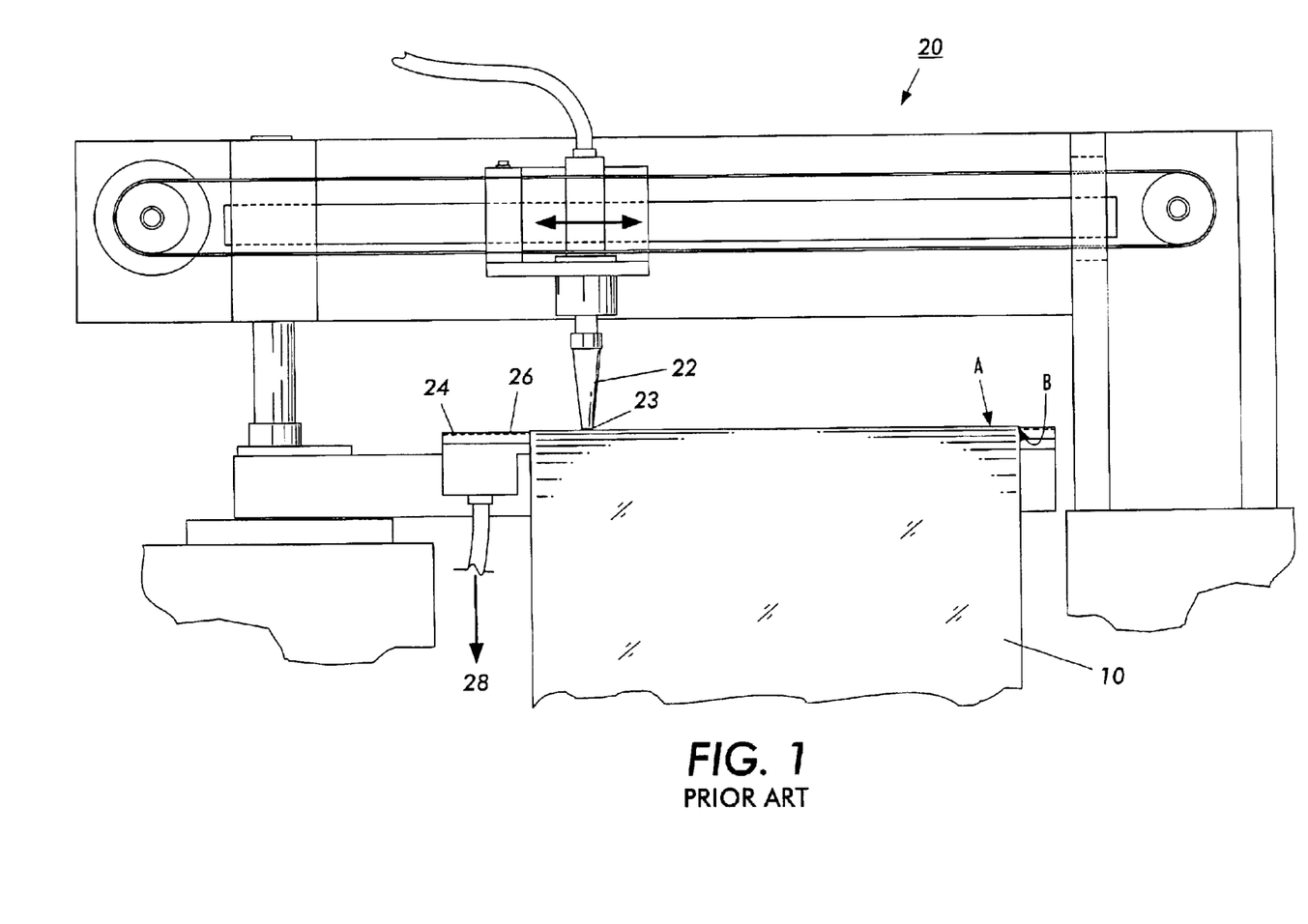
FIGS. 1–3 depict a prior art system for forming an imaging belt.
Figure 2:
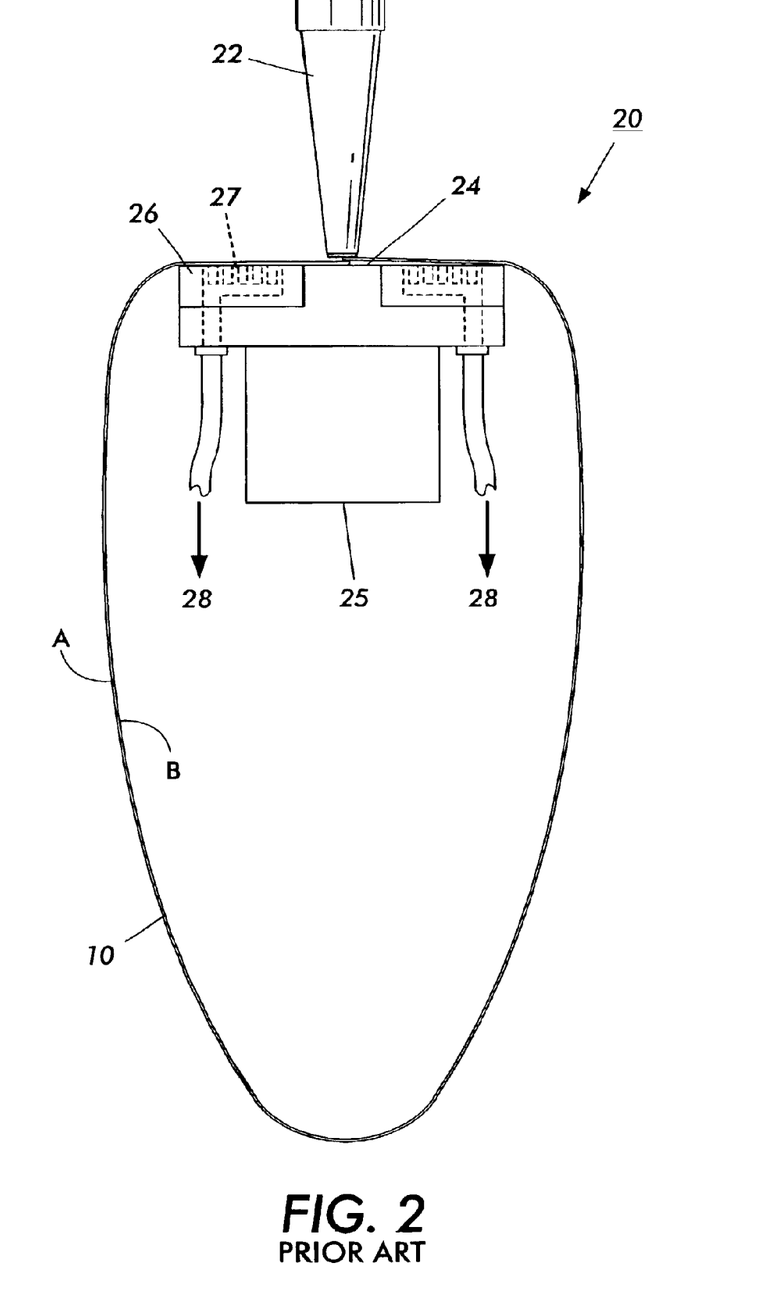
Figure 3:
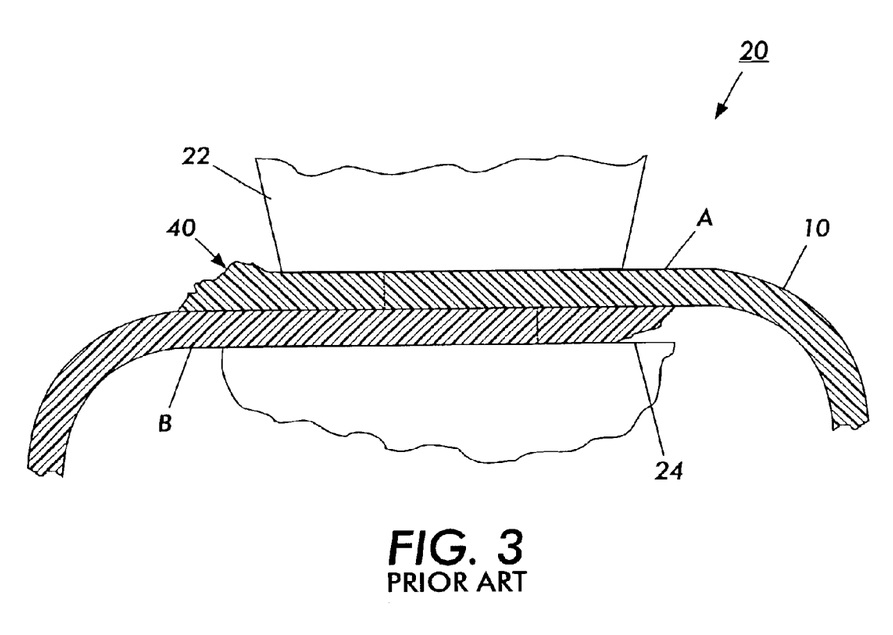

Referring now to FIGS. 1–3, there is shown a prior art system 20 used for making an imaging belt 10. The imaging belt 10 is flexible and includes an outside photosensitive surface A, and an inside surface B. The ends of the belt overlap and are joined by an ultrasonic welding process. The welded seam shown includes a surface roughness on the photosensitive surface A comprising a high protrusion spike 40. The photosensitive side A is welded directly with the contact surface 23 of the ultrasonic welding horn 22 from the outside of the belt 10 toward the inside of the belt. The work surface 24 is in contact with side B.

The welding horn is traversed across the photoconductive material, surface A, causing weld splash to protrude out the top and bottom sides of the seam overlap. This material may comprise all of the coated layers along with some of the substrate material. The mechanical energy of the vibrating horn is transferred into the overlapped material creating heat and pressure, which in turn bonds the two ends together. During this welding process, molten material is squeezed from between the joined edges and flows both out the top and bottom side of the welded seam. This material is commonly referred to as "weld splash". Smoothing out this weld splash area would improve performance and maintenance issues.

Therefore, there is a need to provide an improved flexible imaging belts for improved performance and which is generally free of protrusion spots on a selected surface such as a photosensitive surface.

Reference is made to imaging belts and belt systems in U.S. Pat. Nos. 6,336,982; 5,552,005; 4,883,742; and 4,265,990.

All documents cited herein, including the foregoing, are incorporated herein by reference in their entireties.

In an embodiment there is provided, a method of forming a belt comprising: providing a flexible member having a length, width and thickness, the flexible member having a first end, second end, and a photosensitive surface; providing a member including a work surface; forming the flexible member in a loop shape such that the first end overlaps the second end and forms an overlap region for a selected distance, the photosensitive surface is on the outside of the loop shape, and one of the first end and the second end are positioned on the photosensitive surface; positioning the overlap region of the flexible member in pressure contact with the work surface such that the photosensitive surface is on the outside of the loop shape; positioning a welding toot on an inside surface of the loop shape of the flexible member opposite the overlap region; and ultrasonically welding the flexible member at one or more locations along the overlap region forming a photoreceptor belt.

In another embodiment there is provided, a method of forming a belt comprising: providing a flexible member having a length, width and thickness, the member having a first end, second end, and a photosensitive surface; forming the flexible member in a loop shape such that the first end overlaps the second end and forms an overlap region for a selected distance, the photosensitive surface is on the outside of the loop shape; positioning the overlap region and the photosensitive surface of the member in pressure contact with a work surface such that the photosensitive surface is on the outside of the loop shape; and ultrasonically welding the member at one or more locations along the overlap region.

In a further embodiment there is provided, a method of forming a photoreceptor belt comprising: providing a flexible member having a length, width and thickness, the member having a first end, second end, and a photosensitive surface; forming the flexible member in a loop shape such that the first end overlaps the second end and forms an overlap region for a selected distance, the photosensitive surface is on the outside of the loop shape; positioning the overlap region of the member in pressure contact with a work surface such that the photosensitive surface is on the outside of the loop shape; and ultrasonically welding the flexible member at one or more locations along the overlap region using an ultrasonic horn directed toward the work surface and the overlap region from the inside of the loop.

In yet another embodiment there is provided, a method of forming a belt comprising: providing a flexible member having a length, width and thickness, the member having a first end, second end, and a photosensitive surface; forming the flexible member in a loop shape such that the first end overlaps the second end and forms an overlap region for a selected distance, the photosensitive surface is on the inside of the loop shape; positioning the overlap region of the member in pressure contact with a work surface such that the photosensitive surface is on the inside of the loop shape; ultrasonically welding the flexible member at one or more locations along the overlap region using an ultrasonic horn; and turning the flexible member inside out after welding such that the photosensitive surface originally formed on the inside of the loop is on the outside of the loop.

In a further embodiment there is provided, a flexible belt made by the process comprising: providing a flexible member having a length, width and thickness, the member having a first end, second end, and a photosensitive surface; forming the flexible member in a loop shape such that the first end overlaps the second end and forms an overlap region for a selected distance, the photosensitive surface is on the outside of the loop shape, and one of the first end and the second end are positioned on the photosensitive surface; positioning the overlap region and the photosensitive surface of the member in pressure contact with a work surface such that the photosensitive surface is on the outside of the loop shape; and ultrasonically welding the flexible member at one or more locations along the overlap region.

In yet another embodiment there is provided a method of forming a belt comprising: providing a flexible member having a length, width and thickness, the member having a first end, second end, and a selected surface; providing a member including a work surface, the work surface having a first dimensional area; forming the flexible member in a loop shape such that the first end overlaps the second end and forms an overlap region for a selected distance, the selected surface is on the outside of the loop shape, and one of the first end and the second end are positioned on the selected surface; positioning the overlap region of the flexible member in pressure contact with the work surface such that the selected surface is on the outside of the loop shape, the overlap region having a second dimensional area; positioning a welding tool on an inside surface of the loop shape of the flexible member opposite the overlap region, the welding tool having a contact area having a third dimensional area; and ultrasonically welding the flexible member at one or more locations along the overlap region forming a belt.

Accordingly, the drawing and description are to be regarded as illustrative in nature, and not as restrictive.

Disclosed in the Figures are examples of an improvement in a flexible belt and methods of making the same. In embodiments, the belt may be used in various printers, reproduction system, copiers, and multifunction devices, stand-alone or networked, color or black and white, analog or digital systems including xerographic, or electrophotographic apparatus.

In summary, in embodiments there is provided a method of making a belt, and a belt made by a process, which provides a reduction in surface roughness on a selected surface at a welded seam on a belt.

Figure 4:
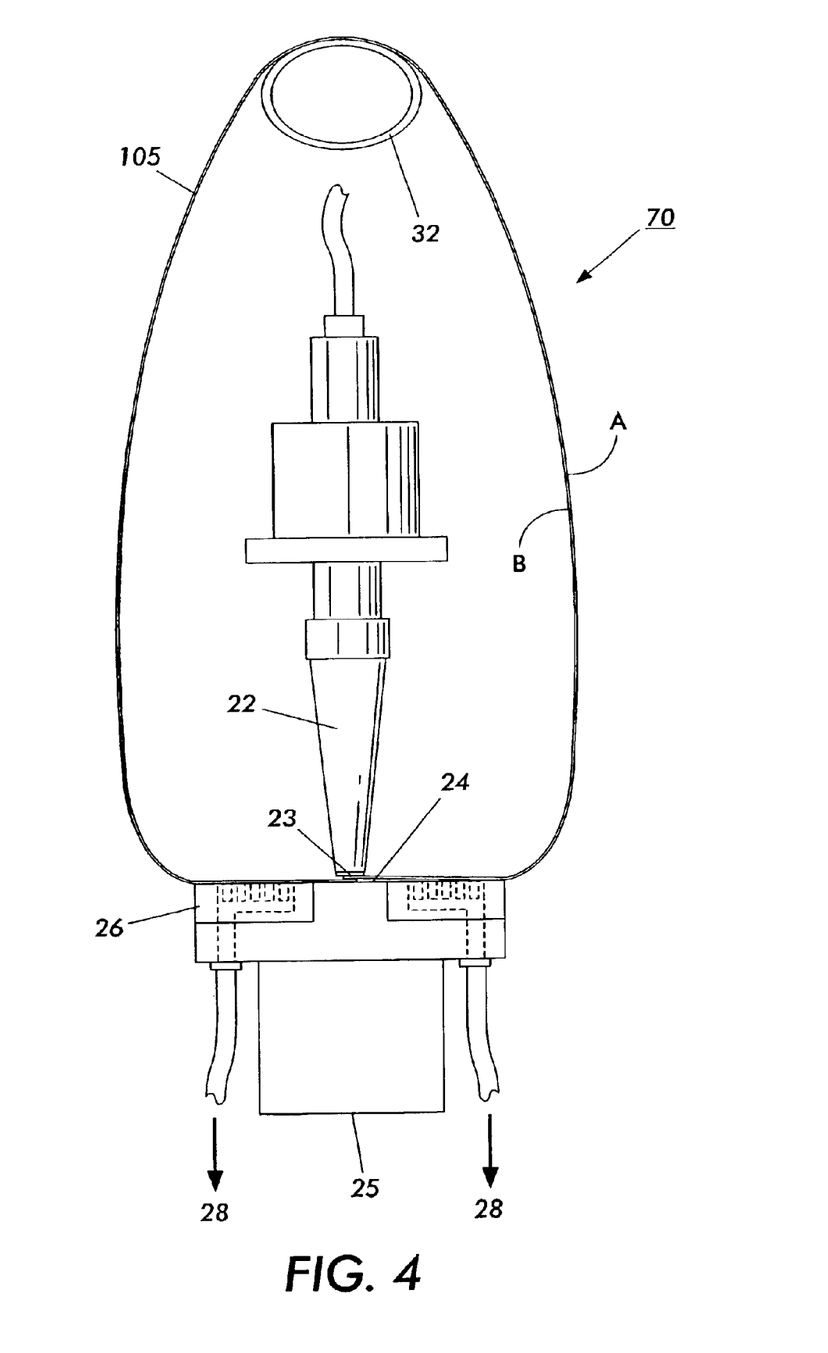
FIG. 4 depicts an embodiment of the system for performing the method of making an imaging belt.
Figure 5:
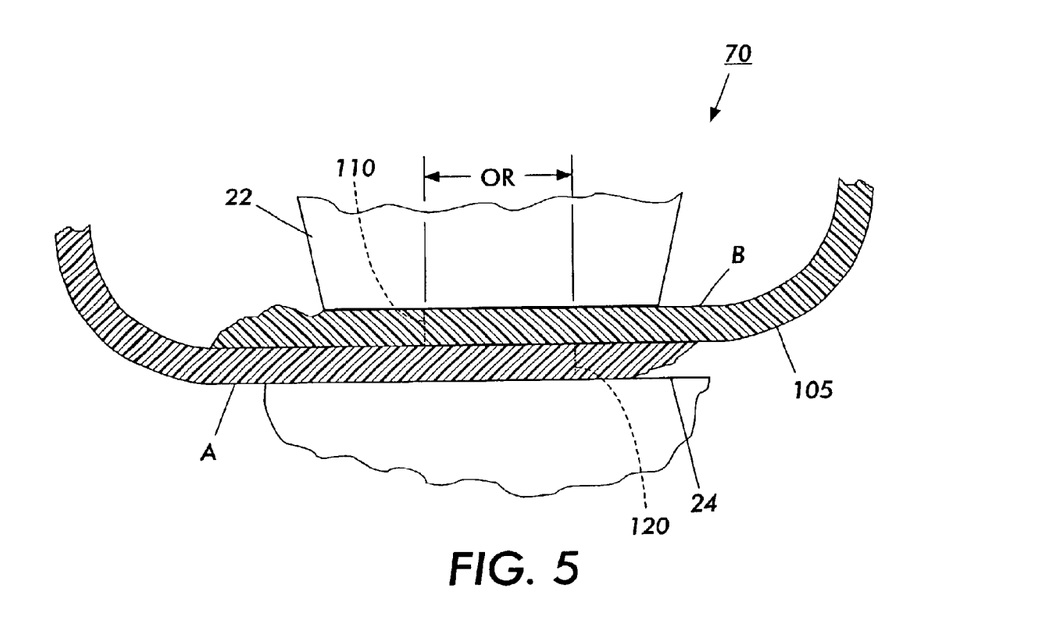
FIG. 5 depicts an embodiment of the system of FIG. 4.
Figure 6:
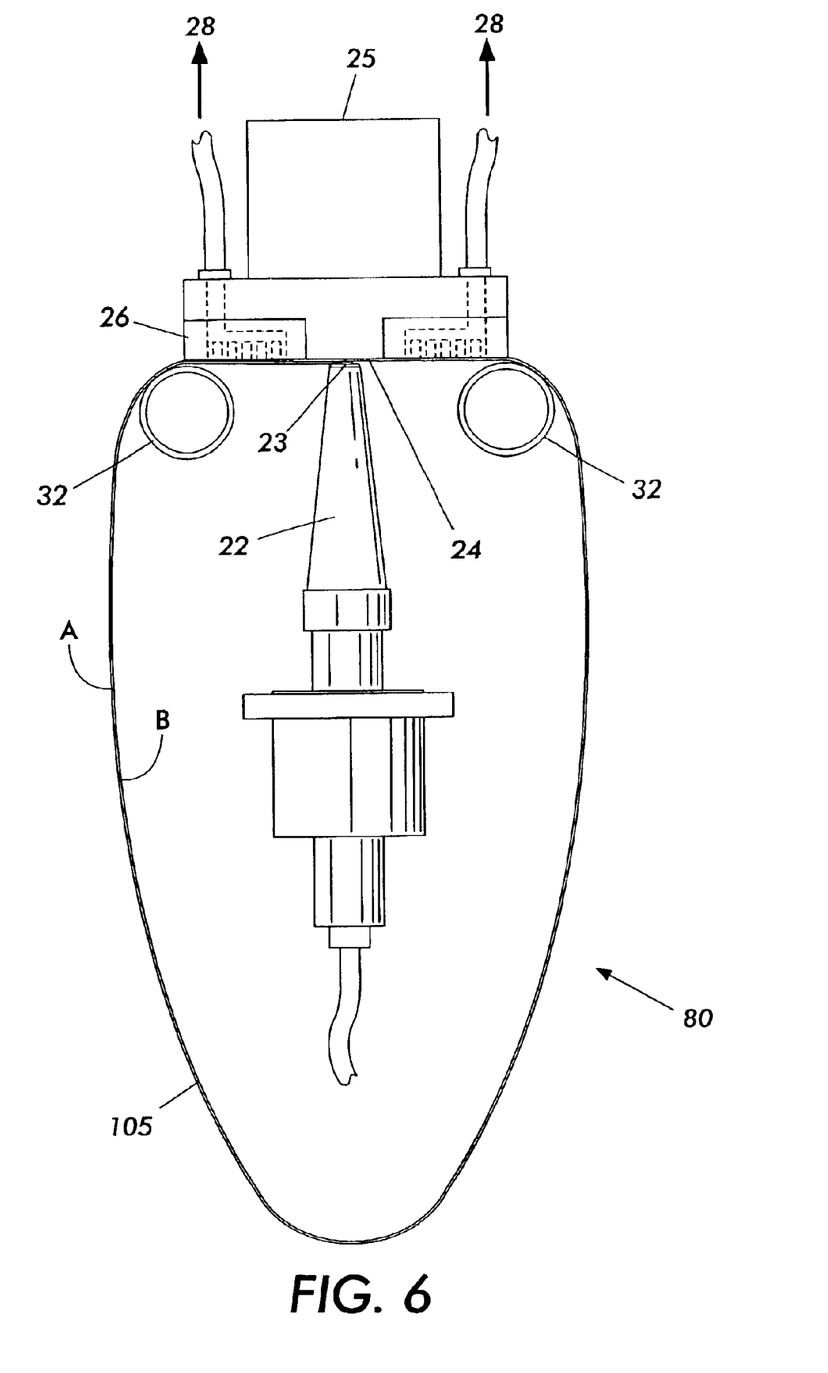
FIG. 6 depicts an embodiment of the system for performing the method of making a belt.
Figure 7:
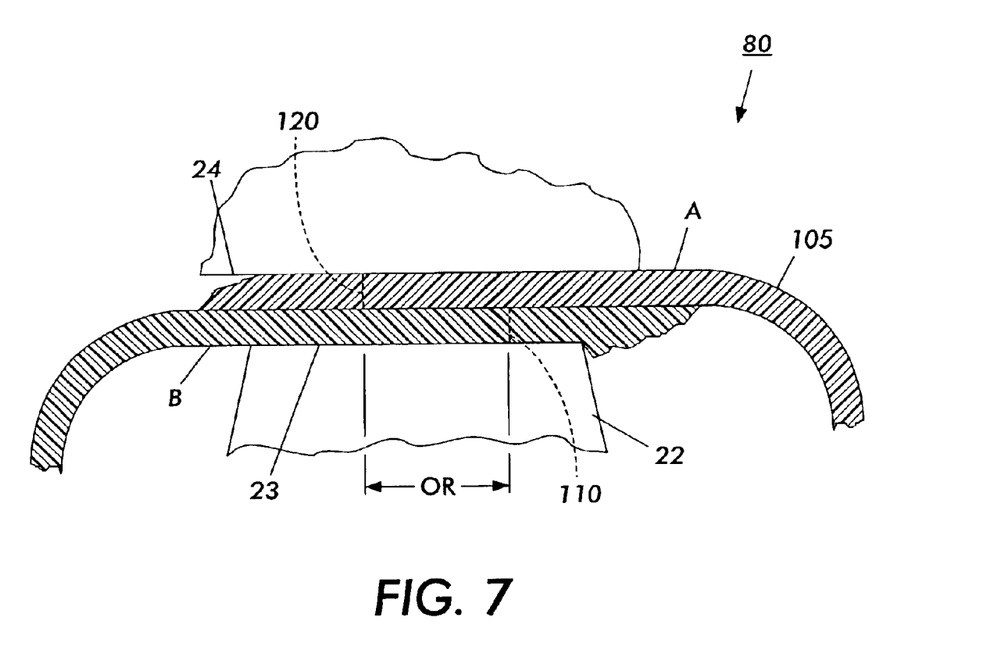
FIG. 7 depicts an embodiment of the system of FIG. 6.

FIG. 4 depicts a side view of an embodiment of an ultrasonic welding system 70 used in making a belt 105. FIG. 5 depicts an enlarged view of the belt 105 of FIG. 4. FIG. 6 depicts a side view of an embodiment of an ultrasonic welding system 80 used in making a belt 105. FIG. 7 depicts an enlarged view of the belt 105 of FIG. 6.

In an embodiment, provided is a flexible member having a length, width and thickness. The flexible member has a first end 110, second end 120, and a photosensitive surface A. The belt 105 is formed in a loop shape such that the first end 110 overlaps the second end 120 and forms an overlap region, OR, for a selected distance, for example, 0.4 mm to 2.0 mm. The overlap region OR is positioned in pressure contact with a work surface 24 associated with a frame 25 such that the photosensitive surface A is on the outside of the belt 105. The belt 105 is ultrasonically welded at one or more locations along the overlap region OR from the inside of the belt 105 such that the contact surface 23 of the ultrasonic horn 22 is directly in contact with surface B. While the ends 110, 120 of the belt 105 at the overlap region are shown square, other embodiments of the ends are envisioned including angles and notches. The belt 105 may be supported by one or more support members 32.

In embodiments, a method of welding the belt 105 reduces weld splash on a selected surface such as a photosensitive surface A. By placing the photosensitive surface A in contact with the work surface 24, the molten weld splash is limited in its ability to flow thereby providing a significantly smoother surface profile on the photosensitive surface A. The weld splash is contained against the work surface 24 such as a steel anvil. The belt circumferences should be large enough for the ultrasonic welding assembly or welding tool to traverse through it. In embodiments, this may include, for example, belts being 5 pitched or greater in size although smaller machinery may allow smaller belts to be manufactured.

In embodiments, the work surface 24 may be situated below the overlap region of the flexible member and the welding tool is directed toward the work surface 24 from the inside of the loop during welding. The work surface 24 may be situated such that it limits flow of the molten, weld splash from forming above the outside surface of the overlap region. A vacuum source 28 may be applied from plenum air holes 27 of a vacuum plenum 26 to the flexible belt 105 prior to ultrasonically welding for holding the flexible belt 105.

Figure 8:
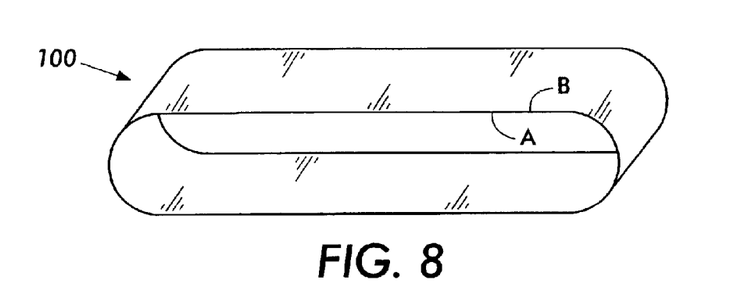
FIG. 8 depicts a formed belt.
Figure 9:
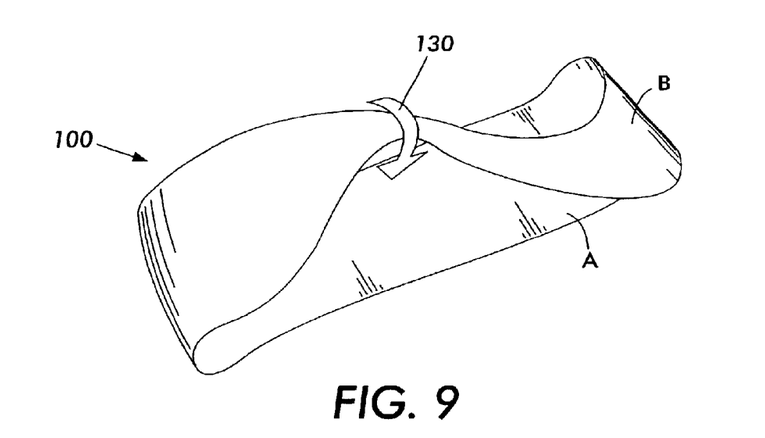
FIG. 9 depicts the formed belt being turned inside out.
Figure 10:
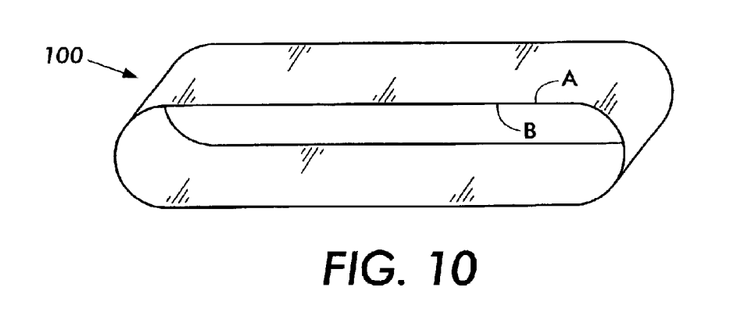
FIG. 10 depicts the formed belt after being turned inside out.

FIG. 8 depicts a formed belt 100 including surfaces, A and B. The belt may be thermally or adhesively joined at a seam using ultrasonic welding as described herein. The selected surface, for example surface A, is first formed on the inside surface. The selected surface A may be a photosensitive surface. Then, as shown in FIG. 9, the formed belt 100 may be turned inside out (step 130) such that the selected surface A is converted to an outside surface. FIG. 10 depicts the formed belt 100 after being turned inside out with the selected surface A now on the outside surface of the belt 100.

In embodiments, the method of making the belt may include: applying a vacuum to the flexible belt prior to ultrasonically welding; using a welding horn situated on the inside of the loop during welding; situating the work surface such that it limits flow of the molten weld splash from forming above the outside surface of the overlap region; and applying an anti-curl coating to a surface of the flexible member prior to forming the flexible member in a loop shape. The welding tool may be an ultrasonic horn. The work surface may have a first contact area greater than the overlap region of the flexible belt and the welding horn may have a second contact area less than the first contact area of the work surface, and the work surface may be situated against the overlap region and the photosensitive surface of the flexible belt during ultrasonic welding. The weld splash may be formed by the ultrasonic welding and the weld splash may be directed by the work surface prior to cooling. The work surface may limit flow of the molten weld splash from forming above the outside surface of the overlap region. The selected distance of the overlap region may range from 0.4 mm to 2.0 mm. The ultrasonic horn may be applied against an inside surface of the photoreceptor member after the photoreceptor member is formed in a loop shape. The inside surface of the photoreceptor member may include an anti-curl coating. The photoreceptor member may form a photoreceptor belt or other belt for use in an electrophotographic apparatus. The first dimensional area of the work surface may be greater than the second dimensional area of the overlap region and greater than the third dimensional area of the contact area of the welding tool. The flexible belt may comprise a photoreceptor belt, electroreceptor belt, or an intermediate image transfer belt.

It is appreciated that various other alternatives, modifications, variations, improvements, equivalents or substantial equivalents of the teachings herein that for example, are or may be presently unforeseen, unappreciated or subsequently arrived at by applicants or others are also intended to be encompassed by the claims and amendments thereto.

What is claimed is:

1. A method of forming a photoreceptor belt comprising:
    providing a flexible member having a length, width and thickness, the flexible member having a first end, second end, and a photosensitive surface;
    providing a member including a work surface;
    forming the flexible member in a loop shape such that the first end overlaps the second end and forms an overlap region for a selected distance, the photosensitive surface is on the outside of the loop shape, and one of the first end and the second end are positioned on the photosensitive surface;
    positioning the overlap region of the flexible member in pressure contact with the work surface such that the photosensitive surface is on the outside of the loop shape;
    positioning a welding tool on an inside surface of the loop shape of the flexible member opposite the overlap region; and
    ultrasonically welding the flexible member at one or more locations along the overlap region forming a photoreceptor belt.

2. The method of claim 1 further comprising applying a vacuum to the flexible member prior to ultrasonically welding.

3. The method of claim 1 wherein the work surface is an anvil.

4. The method of claim 1 wherein the welding tool is an ultrasonic horn.

5. The method of claim 1 wherein the work surface has a first contact area greater than the overlap region of the flexible member and the welding horn has a second contact area less than the first contact area of the work surface and the work surface is situated against the overlap region and the photosensitive surface of the flexible member during ultrasonic welding.

6. The method of claim 1 wherein a weld splash is formed by the ultrasonic welding and the weld splash is directed by the work surface prior to cooling.

7. The method of claim 1 wherein the work surface limits flow of the molten weld splash from forming above the outside surface of the overlap region.

8. The method of claim 1 wherein the selected distance of the overlap region is from 0.4 mm to 2.0 mm.

9. The method of claim 1 wherein the ultrasonic horn is applied against an inside surface of the flexible member after the photoreceptor member is formed in a loop shape.

10. The method of claim 1 wherein the inside surface of the member includes an anti-curl coating.

11. The method of claim 1 wherein the flexible member forms a photoreceptor belt for use in an electrophotographic apparatus.

12. A method of forming a belt comprising:
    providing a flexible member having a length, width and thickness, the member having a first end, second end, and a photosensitive surface;
    forming the flexible member in a loop she such that the first end overlaps the second end and forms an overlap region for a selected distance, the photosensitive surface is on the outside of the loop shape;
    positioning the overlap region and the photosensitive surface of the member in pressure contact with a work surface such that the photosensitive surface is on the outside of the loop; and
    ultrasonically welding the flexible member at one or more locations along the overlap region; wherein the welding is directed toward the work surface from an inside of the loop.

13. The method of claim 12 further comprising using a welding horn situated on the inside of the loop during welding.

14. The method of claim 12 further comprising applying a vacuum to the flexible photoreceptor member prior to ultrasonically welding.

15. The method of claim 12 wherein the work surface is an anvil including a vacuum plenum for holding the flexible member against the anvil.

16. The method of claim 12 further comprising situating the work surface such that a surface of the work surface limits flow of the molten weld splash from forming above the outside surface of the overlap region.

17. A method of forming a photoreceptor belt comprising:
    providing a flexible member having a length, width and thickness, the member having a first end, second end, and a photosensitive surface;
    forming the flexible member in a loop shape such that the first and overlaps the second end and forms an overlap region for a selected distance, the photosensitive surface is on the outside of the loop shape;

positioning the overlap region of the member in pressure contact with a work surface such that the photosensitive surface is on the outside of the loop shape; and ultrasonically welding the flexible member at one or more locations along the overlap region using an ultrasonic horn directed toward the work surface and the overlap region from the inside of the loop.

18. The method of claim 17 further comprising applying a vacuum to the flexible photoreceptor member prior to ultrasonically welding.

19. The method of claim 17 wherein the work surface is an anvil.

20. The method of claim 17 further comprising situating the work surface such that a surface of the work surface limits flow of the molten weld splash from forming above the outside surface of the overlap region.

21. A method of forming a belt comprising:

providing a flexible member having a length, width and thickness, the member having a first end, second end, and a photosensitive surface:

forming the flexible member in a loop shape such that the first end overlaps the second end and forms an overlap region for a selected distance, the photosensitive surface is on the inside of the loop shape;

positioning the overlap region of the member in pressure contact with a work surface such that the photosensitive surface is on the inside of the loop shape;

ultrasonically welding the flexible member at one or more locations along the overlap region using an ultrasonic horn; and turning the flexible member inside out after welding such that the photosensitive surface originally formed on the inside of the loop is on the outside of the loop.

22. The method of claim 21 further comprising applying an anti-curl coating to a surface of the flexible member prior to forming the flexible member in a loop shape.

23. A flexible belt made by the process comprising:

providing a flexible member having a length, width and thickness, the member having a first end, second end, and a photosensitive surface;

forming the flexible member in a loop shape such that the first end overlaps the second end and forms an overlap region for a selected distance, the photosensitive surface is on the outside of the loop shape, and one of the first end and the second end are positioned on the photosensitive surface;

positioning the overlap region and the photosensitive surface of the member in pressure contact with a work surface such that the photosensitive surface is on the outside of the loop shape; and ultrasonically welding the flexible member at one or more locations along the overlap region from inside the loop.

* * * * *